US011590965B2

(12) United States Patent
Sugano

(10) Patent No.: US 11,590,965 B2
(45) Date of Patent: Feb. 28, 2023

(54) AUTOMATED VALET PARKING SYSTEM

(71) Applicant: TOYOTA JIDOSHA KABUSHIKI KAISHA, Toyota (JP)

(72) Inventor: Tatsuya Sugano, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 119 days.

(21) Appl. No.: 17/036,987

(22) Filed: Sep. 29, 2020

(65) Prior Publication Data
US 2021/0122361 A1 Apr. 29, 2021

(30) Foreign Application Priority Data

Oct. 29, 2019 (JP) .............................. JP2019-196561

(51) Int. Cl.
*B60W 30/06* (2006.01)
*G05D 1/02* (2020.01)

(52) U.S. Cl.
CPC ........... *B60W 30/06* (2013.01); *G05D 1/0223* (2013.01); *G05D 1/0234* (2013.01); *G05D 1/0274* (2013.01)

(58) Field of Classification Search
CPC ... B60W 30/06; G05D 1/0223; G05D 1/0234; G05D 1/0274; B62D 15/0285; G08G 1/0125; G08G 1/0137; G08G 1/096725; G08G 1/0968; G08G 1/0969; G08G 1/148
See application file for complete search history.

(56) References Cited

U.S. PATENT DOCUMENTS

| 5,229,941 A | 7/1993 | Hattori |
| 9,557,736 B1* | 1/2017 | Silver .................. G05D 1/0088 |
| 9,969,386 B1* | 5/2018 | Wang ................. B62D 15/0285 |
| 10,338,586 B2* | 7/2019 | Kurt ....................... G08G 1/146 |

(Continued)

FOREIGN PATENT DOCUMENTS

| CN | 102735239 A | 10/2012 |
| CN | 106556399 A | 4/2017 |

(Continued)

OTHER PUBLICATIONS

Notice of Allowance dated May 3, 2022 from the US Patent & Trademark Office in U.S. Appl. No. 16/934,262.

*Primary Examiner* — Kenneth J Malkowski
*Assistant Examiner* — Ibrahim Abdoalatif Alsomairy
(74) *Attorney, Agent, or Firm* — Sughrue Mion, PLLC

(57) ABSTRACT

Provided is an automated valet parking system giving an instruction to a target vehicle by specifying a node section at which the target vehicle is located, setting a node status including information on whether passing of a node is allowed, specifying a target node that is the node including a next-passing node among unpassed nodes of the target vehicle and having a predetermined number smaller than a total number of the unpassed nodes, the next-passing node being the node through which the target vehicle passes next on the target route, and transmitting node information associated with the target node to the target vehicle. When the node status at the next-passing node is re-set from a node impassable status to a node passable status, the automated valet parking system transmits the node information of the target node ahead of the next-passing node among the unpassed nodes to the target vehicle.

20 Claims, 10 Drawing Sheets

(56) References Cited

U.S. PATENT DOCUMENTS

| | | | |
|---|---|---|---|
| 2017/0285654 A1 | 10/2017 | Nagai et al. | |
| 2017/0323567 A1* | 11/2017 | Nordbruch | G05D 1/0261 |
| 2020/0001862 A1* | 1/2020 | Luo | G06V 20/58 |
| 2020/0207334 A1* | 7/2020 | Cho | G08G 1/168 |
| 2021/0114585 A1 | 4/2021 | Sugano | |

FOREIGN PATENT DOCUMENTS

| | | |
|---|---|---|
| CN | 110139794 A | 8/2019 |
| JP | 2017-182263 A | 10/2017 |
| JP | 2019-036057 A | 3/2019 |
| WO | 2018/131322 A1 | 7/2018 |

* cited by examiner

AUTOMATED VALET PARKING SYSTEM

CROSS REFERENCE TO RELATED APPLICATION

This application claims the benefit of priority from Japanese Patent Application No. 2019-196561, filed on Oct. 29, 2019, the entire contents of which are incorporated herein by reference.

TECHNICAL FIELD

The present disclosure relates to an automated valet parking system.

BACKGROUND

In the related art, Japanese Unexamined Patent Publication No. 2017-182263 is known as a technical document relating to an automated valet parking system. This publication discloses an automated valet parking device that automatically parks a vehicle in accordance with route information to a parking space searched based on a parking place map database that manages path information to each parking space inside a parking place and available information for each parking space.

SUMMARY

In the automated valet parking, an instruction is given to an autonomous driving vehicle by transmitting information for automated parking of the autonomous driving vehicle from a parking place management server to the autonomous driving vehicle. As an aspect of information transmission, for example, when information regarding the entire route in the parking place from a drop-off space to a target parking space is collectively transmitted to the autonomous driving vehicle, an amount of transmission data and a memory capacity required in the autonomous driving vehicle may become enormous.

According to an aspect of the present disclosure, there is provided an automated valet parking system that causes an autonomous driving vehicle to autonomously drive along a target route to be parked in a target parking space in a parking place by giving an instruction to the autonomous driving vehicle in the parking place. The system includes a vehicle position acquisition unit configured to acquire a vehicle position that is a position on a parking place map of the autonomous driving vehicle, a parking place map database in which parking place map information is stored, the parking place map information including node position information of a plurality of nodes preset corresponding to a plurality of passages in the parking place and node information regarding a driving boundary and a marker associated with each of the nodes, a node section specification unit configured to specify a node section at which a target vehicle is located based on the vehicle position of the target vehicle and the node position information, the target vehicle being the autonomous driving vehicle that is autonomously driving according to the instruction, a target node specification unit configured to specify a target node that is the node including a next-passing node among unpassed nodes of the target vehicle and having a predetermined number smaller than a total number of the unpassed nodes, the next-passing node being the node through which the target vehicle passes next on the target route, a node status setting unit configured to set a node status including information on whether or not passing of the node is allowed based on a vehicle position of another autonomous driving vehicle in the parking place, a node information acquisition unit configured to acquire the node information associated with the target node based on the target node and the parking place map information, and a vehicle instruction unit configured to give the instruction to the target vehicle by transmitting the node information associated with the target node to the target vehicle based on an acquisition result of the node information acquisition unit, a specification result of the node section specification unit, and a specification result of the target node specification unit. The vehicle instruction unit is configured to, when the node status at the next-passing node is re-set by the node status setting unit from a node impassable status to a node passable status, transmit the node information of the target node ahead of the next-passing node among the unpassed nodes to the target vehicle.

With the automated valet parking system according to the aspect of the present disclosure, a predetermined number of nodes including the next-passing node are specified as the target nodes. The predetermined number is smaller than the total number of unpassed nodes. The target vehicle is instructed by transmitting the node information associated with the target node to the target vehicle. Therefore, as an aspect of information transmission, for example, compared to the case where node information regarding the entire target route in the parking place from a drop-off space to the target parking space is collectively transmitted to the target vehicle, it is possible to reduce an amount of transmission data and a memory capacity required in the target vehicle (autonomous driving vehicle). In addition, with the above-described automated valet parking system, when the node status at the next-passing node is re-set to the node passable status, the node information of the target node ahead of the next-passing node among the unpassed nodes is transmitted to the target vehicle, as the node information required for the target vehicle. Thereby, it is possible to further reduce the amount of transmission data and the memory capacity required in the target vehicle (autonomous driving vehicle).

In the automated valet parking system according to the aspect of the present disclosure, the target node specification unit may be configured to, when a vehicle speed of the target vehicle is equal to or higher than a predetermined vehicle speed threshold, specify the target node by setting the predetermined number as a large number compared to when the vehicle speed is less than the vehicle speed threshold. In this case, it is possible to specify an appropriate number of target nodes according to the vehicle speed of the target vehicle.

In the automated valet parking system according to the aspect of the present disclosure, the node status setting unit may be configured to set the node status based on a traveling state of the target vehicle. In this case, it is possible to set a node status according to the traveling state of the target vehicle.

In the automated valet parking system according to the aspect of the present disclosure, the parking place map information may further include node label information regarding a type of the node, the node label information may include a type of the node indicating that the node is located near a parking space, the node information acquisition unit may be configured to associate the driving boundary and the marker within a predetermined distance from a position of the node with the node based on the parking place map information and the node label information, and the predetermined distance when the node is located near the parking space may be larger than the predetermined distance when the node is not located near the parking space. In this case, it is possible to change the presence range of the driving boundary and the marker associated with the node depending on whether or not the node is located near the parking space as the type of the node.

In the automated valet parking system according to the aspect of the present disclosure, by considering the node status including the information on whether or not passing of the node is allowed, it is possible to further reduce the amount of transmission data related to the transmission of the node information to the autonomous driving vehicle and the memory capacity required in the autonomous driving vehicle.

DETAILED DESCRIPTION

Hereinafter, an embodiment of the present disclosure will be described with reference to the drawings.

Figure 1:
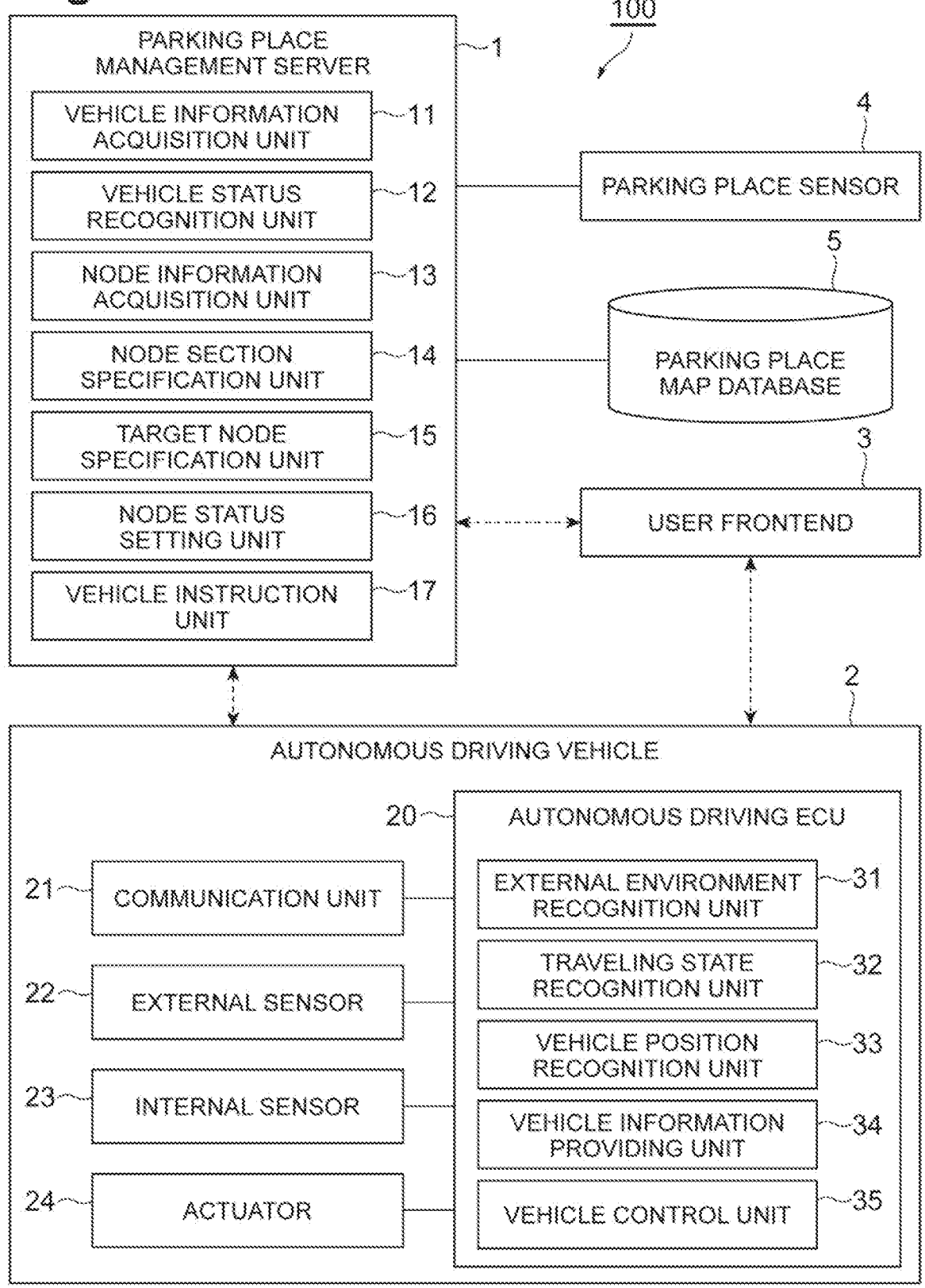
FIG. 1 is a block diagram illustrating an automated valet parking system according to an embodiment.

FIG. 1 is a block diagram illustrating an automated valet parking system 100 according to an embodiment. The automated valet parking system (AVPS) 100 illustrated in FIG. 1 is a system for performing automated valet parking of an autonomous driving vehicle 2 in a parking place.

The automated valet parking is a service that allows a driverless autonomous driving vehicle 2, after a user (occupant) has got out of the vehicle at a drop-off area in a parking place, to travel along a target route according to an instruction from the parking place side, and that automatically parks the vehicle in a target parking space in the parking place. The target parking space is a parking space preset as a parking position of the autonomous driving vehicle 2. The target route is a route in the parking place where the autonomous driving vehicle 2 travels to reach the target parking space. The target route at the time of pick-up is a route on which the vehicle travels to reach a pick-up space to be described later.

The parking place may be a parking place dedicated to automated valet parking, or may also serve as a parking place for general vehicles that are not subject to automated valet parking. A part of the parking place for general vehicles may be used as an area dedicated to automated valet parking. In the present embodiment, a parking place dedicated to automated valet parking will be used as an example for description.

Figure 2:
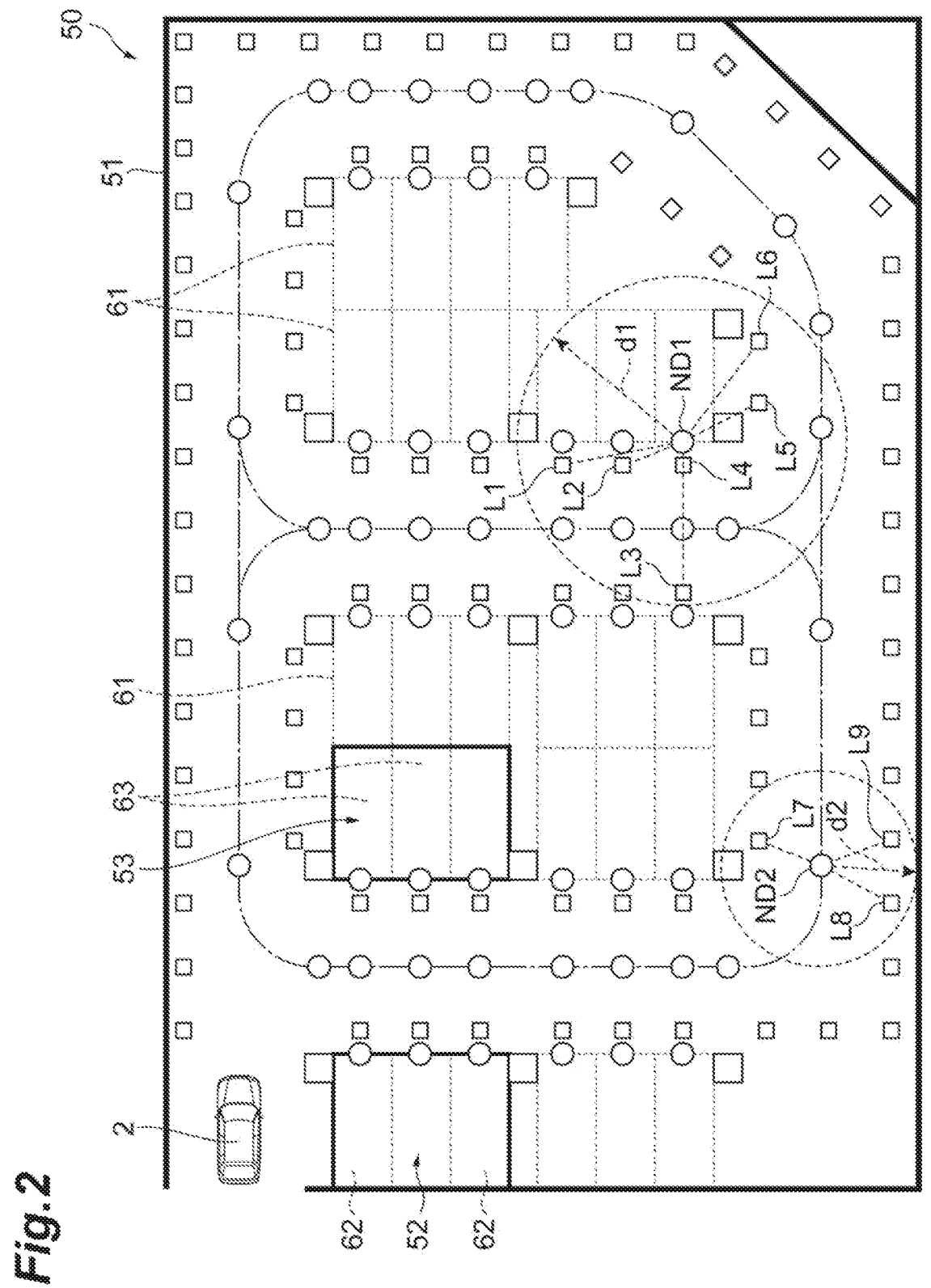
FIG. 2 is a plan view illustrating an example of a parking place where automated valet parking is performed.
Figure 3:
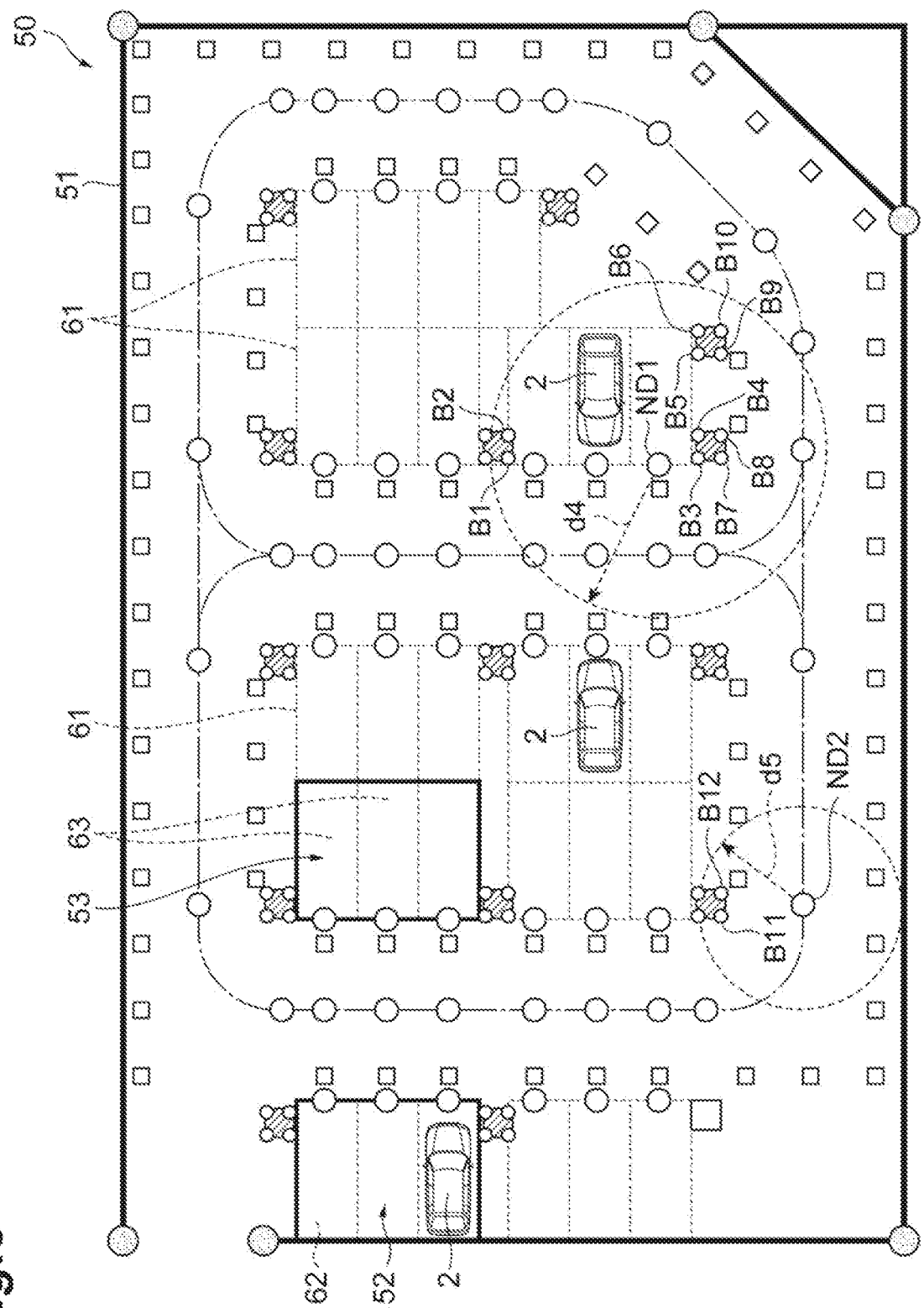
FIG. 3 is a plan view illustrating an example of a parking place where automated valet parking is performed.

Here, FIGS. 2 and 3 are plan views illustrating an example of a parking place where automated valet parking is performed. FIGS. 2 and 3 illustrate a parking place 50 for automated valet parking, a parking area 51, a drop-off area 52, and a pick-up area 53. The parking place 50 includes the parking area 51, the drop-off area 52, and the pick-up area 53. The drop-off area 52 and the pick-up area 53 do not need to be provided separately, and may be provided as an integrated platform.

The parking area 51 is a place where a parking space (parking frame) 61 in which the autonomous driving vehicle 2 is parked by the automated valet parking is formed. As illustrated in FIGS. 2 and 3, for example, a plurality of parking spaces 61 are formed side by side in one direction (the vehicle width direction of a parked vehicle). The drop-off area 52 is provided near the doorway of the parking place 50, and is a place where an occupant including a user gets out of the autonomous driving vehicle 2 before entering the parking space. The drop-off area 52 is formed with a drop-off space 62 for the autonomous driving vehicle 2 to stop when the occupant gets out of the vehicle.

The pick-up area 53 is provided near the doorway of the parking place 50, and is a place where the occupant gets on the autonomous driving vehicle 2 that has been picked up. The pick-up area 53 is formed with a pick-up space 63 where the autonomous driving vehicle 2 waits for the occupant to get on the vehicle.

In the automated valet parking system 100, for example, after the autonomous driving vehicle 2 that has entered the parking place 50 drops off the occupant in the drop-off space 62, the automated valet parking is started by obtaining an instruction authority of the autonomous driving vehicle 2. The automated valet parking system 100 causes the autonomous driving vehicle 2 to travel toward a target parking space in the parking area 51, and parks the autonomous driving vehicle 2 in a target parking space. The automated valet parking system 100 causes the autonomous driving vehicle 2 that is parked to travel toward the pick-up area 53 in response to a pick-up request, and causes the autonomous driving vehicle 2 to wait for the occupant to arrive in the pick-up space 63.

In the automated valet parking system 100, during execution of automated valet parking, when the autonomous driving vehicle 2 is traveling toward the target parking space in the parking area 51 and when the autonomous driving vehicle 2 is traveling toward the pick-up area 53, an instruction is given to the autonomous driving vehicle 2 by transmitting information regarding driving boundaries and landmarks (markers) to the autonomous driving vehicle 2. Details of such information transmission to the autonomous driving vehicle 2 will be described later.

[Configuration of Automated Valet Parking System]

Hereinafter, the configuration of the automated valet parking system 100 will be described with reference to the drawings. As illustrated in FIG. 1, the automated valet parking system 100 includes a parking place management server 1. The parking place management server 1 is a server for managing the parking place.

The parking place management server 1 is configured to be able to communicate with the autonomous driving vehicle 2 and the user frontend 3. The details of the autonomous driving vehicle 2 and the user frontend 3 will be described later. The parking place management server 1 may be provided in the parking place or may be provided in a facility away from the parking place. The parking place management server 1 may include a plurality of computers provided at different locations.

The parking place management server 1 is connected to a parking place sensor 4 and a parking place map database 5. The parking place sensor 4 is a parking place infrastructure sensor for recognizing the status in the parking place 50. The parking place sensor 4 includes an empty sensor for detecting whether or not a parked vehicle is present in each parking space (whether each parking space is full or empty).

The empty sensor may be provided for each parking space, or may be provided on a ceiling or the like to be able to monitor a plurality of parking spaces by one. The configuration of the empty sensor is not particularly limited, and a known configuration can be employed. The empty sensor may be a pressure sensor, a radar sensor or a sonar sensor using radio waves, or a camera. The empty sensor transmits detection information on the parked vehicle in the parking space to the parking place management server 1.

The parking place sensor 4 may include a surveillance camera for detecting the autonomous driving vehicle 2 traveling on the traveling path of the parking place 50. The surveillance camera is provided on a ceiling or a wall of the parking place, and captures an image of the traveling autonomous driving vehicle 2. The surveillance camera transmits the captured image to the parking place management server 1.

The parking place map database 5 is a database that stores parking place map information. The parking place map information includes position information of the parking space in the parking place, position information of the drop-off space, position information of the pick-up space, and information of the traveling path in the parking place. In addition, the parking place map information includes node position information of a plurality of nodes preset corresponding to a plurality of passages in the parking place, position information of driving boundaries used for autonomous driving of the autonomous driving vehicle 2, and position information of landmarks used by the autonomous driving vehicle 2 for position recognition.

In FIGS. 2 and 3, a plurality of nodes ND1, ND2, and the like which are preset corresponding to a plurality of passages in the parking place 50 are indicated by white circles. As an example, the plurality of nodes are set such that the node positions are separated from each other at predetermined intervals along an imaginary line extending substantially in the center of the plurality of passages in the parking place 50. In the example of FIGS. 2 and 3, as indicated by a one-dot chain line, an imaginary line extending along the plurality of passages in the parking place 50 is assumed, and a plurality of nodes are set on the imaginary line. The predetermined interval does not necessarily have to be constant.

For example, in a straight-line section of a passage, a pair of nodes are set at end points (start point and ending point) of the straight-line section. The nodes are used for the autonomous driving vehicle 2 to autonomously drive in a straight-line section. The nodes may be further set in the section sandwiched between the end points of the straight-line section of the passage.

In the straight-line section of the passage, when the entrance of each parking space 61 faces a section sandwiched between the end points of the straight-line section, a node is set in front of each parking space 61, and the node is set on the frame line corresponding to the entrance of the parking space 61. The nodes are used to transmit information on the driving boundaries and landmarks around the parking space 61 to the autonomous driving vehicle 2 when the autonomous driving vehicle 2 is subjected to automated parking in the parking space 61. The nodes may be further set around the parking space 61.

A curve section of the passage is defined by the nodes at the end points of the straight-line sections (end points on the curve section side) that are adjacent to each other to sandwich the curve section. For example, a pair of nodes (nodes corresponding to the start point or the ending point of the curve) that are the end points of the curve section of the passage may overlap each node of the end points of the straight-line sections that are adjacent to each other. In the curve section of the passage, the imaginary line can be assumed to be a curved line connecting the nodes. The nodes are used for the autonomous driving vehicle 2 to autonomously drive in a curve section. The nodes may be further set within the section sandwiched between the nodes at the end points of the straight-line sections that are adjacent to each other (hereinafter, also simply referred to as "in the curve section").

Here, the driving boundary means an object that can define a travelable range when the autonomous driving vehicle 2 travels in autonomous driving. As the driving boundary, a position on the object fixedly provided in the parking place 50 can be used. As the driving boundary, for example, at least one of a predetermined position (for example, an apex) on the surface of a pillar of the parking place 50, a predetermined position on a wall surface of the parking place 50, an installation position of a pole, an installation position of a safety cone, an installation position of a road tack, and the like is used. The landmark means an object serving as a reference of a relative position for recognizing the position of the autonomous driving vehicle 2 in the parking place 50. As the landmark, an object fixedly provided in the parking place 50 can be used. As the landmark, for example, at least one of a pillar of the parking place 50, a wall of the parking place 50, a pole, a safety cone, a road tack, and the like is used. In the example of FIG. 2, a plurality of landmarks L1 to L9 in the parking place 50 are indicated by small white squares. In the example of FIG. 3, a plurality of pillars in the parking place 50 are indicated by squares with hatching, driving boundaries B1 to B12 are indicated by small white circles as the vertex positions on the surface. The information regarding the driving boundaries and the landmarks is associated with each of the nodes (details will be described later).

The parking place map information further includes node label information regarding a type of the node. The node label information means information assigned to each node by using a type of the node as a label. The type of the node means a type of the position of the nodes in the parking place 50. The type of the node includes, for example, a first node type in which a node is located near a parking space, a second node type in which a node is located in a curve section, and a third node type in which no node is located near a parking space or in a curve section. The nodes of the third node type here are located in a straight-line section.

Figure 4:
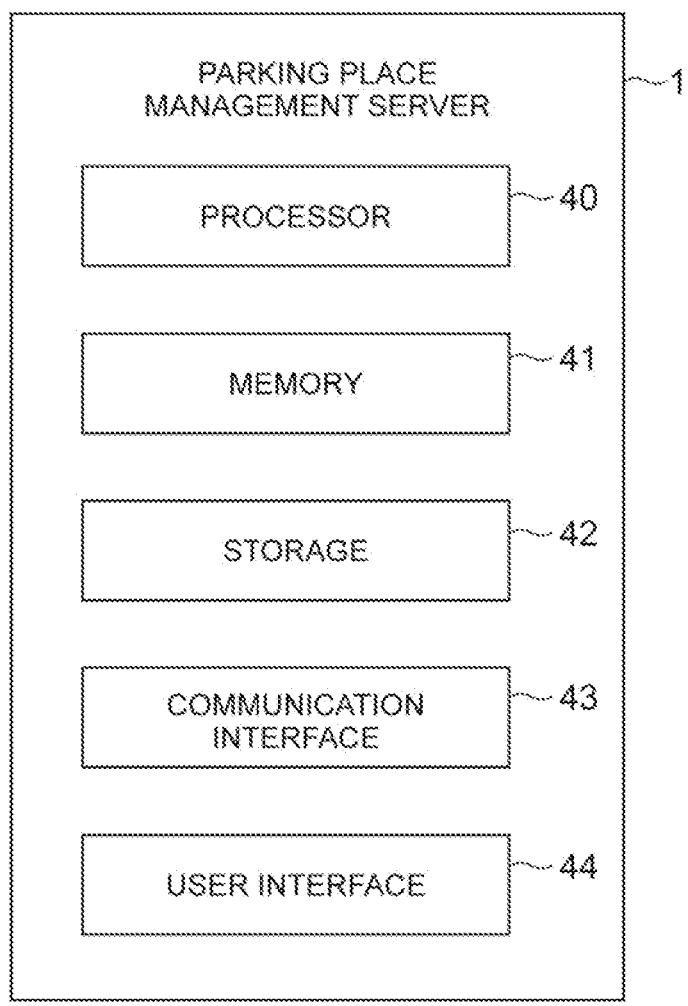
FIG. 4 is a block diagram illustrating an example of a hardware configuration of a parking place management server.

A hardware configuration of the parking place management server 1 will be described. FIG. 4 is a block diagram illustrating an example of a hardware configuration of the parking place management server. As illustrated in FIG. 4, the parking place management server 1 is configured as a general computer including a processor 40, a memory 41, a storage 42, a communication interface 43, and a user interface 44.

The processor 40 operates various operating systems to control the parking place management server 1. The processor 40 is an arithmetic logic unit such as a central processing unit (CPU) including a control device, an arithmetic device, a register, and the like. The processor 40 centrally controls the memory 41, the storage 42, the communication interface 43, and the user interface 44. The memory 41 is a recording medium such as a read only memory (ROM), and a random access memory (RAM). The storage 42 is a recording medium such as a hard disk drive (HDD).

The communication interface 43 is a communication device for performing wireless communication through a network. As the communication interface 43, a network device, a network controller, a network card, or the like can be used. The parking place management server 1 communicates with the autonomous driving vehicle 2 and the user frontend 3 using the communication interface 43. The user interface 44 is an input/output unit of the parking place management server 1 for an administrator of the parking place management server 1 or the like. The user interface 44 includes an output device such as a display and a speaker, and an input device such as a touch panel.

Next, a functional configuration of the parking place management server 1 will be described. As illustrated in FIG. 1, the parking place management server 1 includes a vehicle information acquisition unit (vehicle position acquisition unit) 11, a vehicle status recognition unit 12, a node information acquisition unit 13, a node section specification unit 14, a target node specification unit 15, a node status setting unit 16, and a vehicle instruction unit 17.

The vehicle information acquisition unit 11 acquires vehicle information of the autonomous driving vehicle 2 through communication with the autonomous driving vehicle 2 to be subject to automated valet parking. The vehicle information includes identification information of the autonomous driving vehicle 2 and vehicle position information and the like of the autonomous driving vehicle 2 in the parking place. The vehicle position information is information about the vehicle position which is the position of the autonomous driving vehicle 2 on the parking place map. The identification information may be any information as long as it can specify each of the autonomous driving vehicles 2. The identification information may be an identification number (ID number), a vehicle number, a reservation number for automated valet parking, or the like.

The vehicle information may include the type of the autonomous driving vehicle 2 or may include a vehicle number separately from the identification information. The vehicle information may include vehicle entrance reservation information such as a vehicle entrance reservation time, or may include a scheduled pick-up time. The vehicle information may include vehicle body information such as a turning radius, a total length, and a vehicle width of the autonomous driving vehicle 2, or may include information regarding the autonomous driving function of the autonomous driving vehicle 2. The information regarding the autonomous driving function may include version information of the autonomous driving.

The vehicle information may include recognition results of a traveling state of the autonomous driving vehicle 2 and an external environment. The recognition of the traveling state and the external environment will be described later. The vehicle information may include information on the remaining mileage or remaining fuel of the autonomous driving vehicle 2.

The vehicle information acquisition unit 11 continuously acquires vehicle information from the autonomous driving vehicle 2 during automated valet parking. The vehicle information acquisition unit 11 may continuously acquire vehicle information from a specific autonomous driving vehicle 2 (hereinafter, referred to as a target vehicle 2) that is autonomously driving according to an instruction during the automated valet parking. When an autonomous driving vehicle 2 different from the target vehicle 2 is autonomously driving according to an instruction, the vehicle information acquisition unit 11 may continuously acquire vehicle information from the different autonomous driving vehicle 2. While the target vehicle 2 and/or the autonomous driving vehicle 2 is parked, the vehicle information acquisition unit 11 may interrupt the acquisition of the vehicle information, or may periodically acquire the vehicle information. Hereinafter, it is assumed that when referred to as the "different autonomous driving vehicle 2", "another autonomous driving vehicle 2", or the "other autonomous driving vehicle 2", the target vehicle 2 is not included, and when simply referred to as the "autonomous driving vehicle 2", the target vehicle 2 may be included.

The vehicle status recognition unit 12 recognizes a status of the autonomous driving vehicle 2 during automated valet parking based on the vehicle information acquired by vehicle information acquisition unit 11. The status of the autonomous driving vehicle 2 includes vehicle positions of a plurality of autonomous driving vehicles 2 that are autonomously driving.

The node information acquisition unit 13 acquires node information based on the vehicle position recognized by the vehicle status recognition unit 12 and the parking place map information. The node information is information regarding driving boundaries and landmarks that are associated with each of a plurality of nodes. The node information includes, for example, position information regarding driving boundaries and landmarks around a certain node.

The node information acquisition unit 13 associates a driving boundary and a landmark within a predetermined distance from a position of each node with the node based on the parking place map information, for example. The node information acquisition unit 13 may associate the driving boundary and the landmark within a predetermined distance from the position of the node with the node based further on the node label information.

The node information acquisition unit 13 determines whether or not a distance from the position of the node to the position of the landmark is equal to or less than a predetermined landmark distance threshold (predetermined distance) based on the node position information, the position information of the landmark, and the node label information. The landmark distance threshold is a threshold of a distance for determining whether or not to associate a landmark with a node. As the landmark distance threshold, for example, according to the node label information, it is possible to use a first distance when the node is located near the parking space, a second distance when the node is located in the curve section, and a third distance when the node is located at a position other than near the parking space and in the curve section.

More specifically, when it is determined whether or not the node is located near the parking space, and determination is made that the node is located near the parking space, the node information acquisition unit 13 determines whether or not the distance from the position of the node to the position of the landmark is equal to or less than the first distance for the landmark around the node. When it is determined whether or not the node is located in the curve section, and determination is made that the node is located in the curve section, the node information acquisition unit 13 determines whether or not the distance from the position of the node to the position of the landmark is equal to or less than the second distance for the landmark around the node. When determination is made that the node is not located near the parking space, and that the node is not located in the curve section (when the node is located at a position other than near the parking space and in the curve section), the node information acquisition unit 13 determines whether or not the distance from the position of the node to the position of the landmark is equal to or less than the third distance for the landmark around the node.

Here, the case where the node is located near the parking space corresponds to a case where the node type of the node to be associated is the first node type. The case where the node is located in the curve section corresponds to a case where the node type of the node to be associated is the second node type. The case where the node is located at a position other than near the parking space and in the curve section corresponds to a case where the node type of the node to be associated is the third node type (when it is neither the first node type nor the second node type).

The first distance when the node is located near the parking space is larger than the second distance when the node is located in the curve section. This is because in consideration of the turning operation of the autonomous driving vehicle 2, more information is transmitted to the autonomous driving vehicle 2 than in the curve section and the straight-line section. The second distance when the node is located in the curve section is larger than the third distance when the node is located at a position other than near the parking space and in the curve section. That is, the landmark distance threshold when the node is located near the parking space is larger than the landmark distance threshold when the node is not located near the parking space. This is because in consideration of the inner wheel difference, the blind spot, and the like of the autonomous driving vehicle 2 in the curve section, more information is transmitted to the autonomous driving vehicle 2 than in the straight-line section. The magnitude relationship among the first distance, the second distance, and the third distance is not limited to this example.

When the node is located near the parking space, and determination is made that the distance from the position of the node to the position of the landmark is equal to or less than the first distance, the node information acquisition unit 13 may associate the landmark with the node. When the node is located in the curve section, and determination is made that the distance from the position of the node to the position of the landmark is equal to or less than the second distance, the node information acquisition unit 13 may associate the landmark with the node. When the node is located at a position other than near the parking space and in the curve section, and determination is made that the distance from the position of the node to the position of the landmark is equal to or less than the third distance, the node information acquisition unit 13 may associate the landmark with the node.

As an example, in FIG. 2, for the node ND1 located near the parking space, the node information acquisition unit 13 associates the landmarks L1 to L6 presented at the position where the distance from the position of the node ND1 is equal to or less than a first distance d1 with the node ND1. For the node ND2 located in the curve section, the node information acquisition unit 13 associates the landmarks L7 to L9 presented at the position where the distance from the position of the node ND2 is equal to or less than a second distance d2 with the node ND2.

For example, the node information acquisition unit 13 determines whether or not a distance from the position of the node to the position of the driving boundary is equal to or less than a predetermined driving boundary distance threshold (predetermined distance) based on the node position information, the position information of the driving boundary, and the node label information. The driving boundary distance threshold is a threshold of a distance for determining whether or not to associate a driving boundary with a node. As the driving boundary distance threshold, for example, it is possible to use a fourth distance when the node is located near the parking space, a fifth distance when the node is located in the curve section, and a sixth distance when the node is located at a position other than near the parking space and in the curve section.

More specifically, when it is determined whether or not the node is located near the parking space, and determination is made that the node is located near the parking space, the node information acquisition unit 13 determines whether or not the distance from the position of the node to the position of the driving boundary is equal to or less than the fourth distance for the driving boundary around the node. When it is determined whether or not the node is located in the curve section, and determination is made that the node is located in the curve section, the node information acquisition unit 13 determines whether or not the distance from the position of the node to the position of the driving boundary is equal to or less than the fifth distance for the driving boundary around the node. When determination is made that the node is not located near the parking space, and that the node is not located in the curve section (when the node is located at a position other than near the parking space and in the curve section), the node information acquisition unit 13 determines whether or not the distance from the position of the node to the position of the driving boundary is equal to or less than the sixth distance for the driving boundary around the node.

The fourth distance when the node is located near the parking space is larger than the fifth distance when the node is located in the curve section. This is because in consideration of the turning operation (so-called head swinging operation or the like) of the autonomous driving vehicle 2, more information is transmitted to the autonomous driving vehicle 2 than in the curve section and the straight-line section. The fifth distance when the node is located in the curve section is larger than the sixth distance when the node is located at a position other than near the parking space and in the curve section. That is, the driving boundary distance threshold when the node is located near the parking space is larger than the driving boundary distance threshold when the node is not located near the parking space. This is because in consideration of the inner wheel difference, the blind spot, and the like of the autonomous driving vehicle 2 in the curve section, more information is transmitted to the autonomous driving vehicle 2 than in the straight-line section. The magnitude relationship among the fourth distance, the fifth distance, and the sixth distance is not limited to this example. In addition, the fourth distance may be equal to or different from the first distance. The fifth distance may be equal to or different from the second distance. The sixth distance may be equal to or different from the third distance.

When the node is located near the parking space, and determination is made that the distance from the position of the node to the position of the driving boundary is equal to or less than the fourth distance, the node information acquisition unit 13 may associate the driving boundary with the node. When the node is located in the curve section, and determination is made that the distance from the position of the node to the position of the driving boundary is equal to or less than the fifth distance, the node information acquisition unit 13 may associate the driving boundary with the node. When the node is located at a position other than near the parking space and in the curve section, and determination is made that the distance from the position of the node to the position of the driving boundary is equal to or less than the sixth distance, the node information acquisition unit 13 may associate the driving boundary with the node.

As an example, in FIG. 3, for the node ND1 located near the parking space, the node information acquisition unit 13 associates the driving boundaries B1 to B10 presented at the position where the distance from the position of the node ND1 is equal to or less than a fourth distance d4 with the node ND1. For the node ND2 located in the curve section, the node information acquisition unit 13 associates the driving boundaries B11 and B12 presented at the position where the distance from the position of the node ND2 is equal to or less than a fifth distance d5 with the node ND2.

In order to transmit node information to the target vehicle 2, the node information acquisition unit 13 acquires node information associated with a target node based on the node information associated with each node and the target node to be described later. For example, for one or more nodes specified as target nodes by the target node specification unit 15 to be described later, the node information acquisition unit 13 acquires position information of landmarks and position information of driving boundaries associated with the target nodes.

Incidentally, when it is determined whether the automated parking of the autonomous driving vehicle 2 is completed and determination is made that the automated parking of the autonomous driving vehicle 2 is completed, the node information acquisition unit 13 may re-associate the node information described above.

The node section specification unit 14 specifies a node section where the target vehicle 2 is located based on the vehicle position of the target vehicle 2 and the node position information. The node section is a section from one node to another node, and is a section sandwiched between two adjacent nodes as an example. The node section may be a section sandwiched between two nodes that are not adjacent to each other.

For example, the node section may be configured such that a node behind in an advancing direction of the target vehicle 2 is included and a node ahead in the advancing direction of the target vehicle 2 is not included. In this case, as an example of the method of updating the node section, the node section specification unit 14 determines whether or not the vehicle position of the target vehicle 2 has reached the position of a next-passing node. The next-passing node is a node through which the target vehicle 2 passes next among unpassed nodes (nodes on the target route) of the target vehicle 2. For example, when the vehicle position of the target vehicle 2 has reached an imaginary straight line that passes through the next-passing node and extends in the width direction of the passage of the parking place 50, the node section specification unit 14 can determine that the vehicle position of the target vehicle 2 has reached the position of the next-passing node.

When it is determined whether or not the vehicle position of the target vehicle 2 has reached the position of the next-passing node, and determination is made that the vehicle position of the target vehicle 2 has reached the position of the next-passing node, the node section specification unit 14 re-specifies the node section starting from the next-passing node reached by the target vehicle 2 and re-sets the node next to the next-passing node reached by the target vehicle 2 as a new next-passing node. The method of updating the node section is not limited to the above example.

The target node specification unit 15 specifies a target node. The target node means a node that is a transmission target when node information is transmitted to the target vehicle 2. The target node includes the next-passing node of the target vehicle 2. That is, since node information of the next-passing node is information necessary for continuing the autonomous driving of the target vehicle 2, the next-passing node is a transmission target when the node information is transmitted to the target vehicle 2.

The target node includes a predetermined number of nodes smaller than the total number of unpassed nodes. The predetermined number is, for example, a number smaller than the total number of unpassed nodes on the target route. The unpassed node on the target route means one or more nodes lined up along a target route, in the target route from the current vehicle position of the target vehicle 2 to the destination (for example, the target parking space or the pick-up space). By making the number of target nodes smaller than the total number of unpassed nodes on the target route, the amount of transmission data and the memory capacity required in the target vehicle 2 are reduced compared to the case where node information regarding the entire target route in the parking place from the drop-off space to the target parking space is collectively transmitted to the target vehicle 2 at the time of entering the parking space, for example. The amount of transmission data and the memory capacity required in the target vehicle 2 are also reduced compared to the case where node information regarding the entire target route in the parking place from the parking space to the pick-up space is collectively transmitted to the target vehicle 2 at the time of pick-up, for example.

The target node specification unit 15 may increase the predetermined number according to the increase in the vehicle speed of the target vehicle 2. The target node specification unit 15 may decrease the predetermined number according to the decrease in the vehicle speed of the target vehicle 2. As an example, when the vehicle speed of the target vehicle 2 is equal to or higher than a predetermined vehicle speed threshold, the target node specification unit 15 may specify the target node by setting a predetermined number as a large number (for example, N1) compared to when the vehicle speed is less than the vehicle speed threshold (for example, N2). The vehicle speed threshold is a threshold of a vehicle speed for switching a predetermined number of target nodes. By increasing or decreasing the predetermined number according to the increase or decrease of the vehicle speed, for example, it is possible to suppress the change in the number of target nodes included in the section of the distance traveled by the target vehicle 2 in a certain fixed time.

The node status setting unit 16 sets a node status based on a vehicle position of another autonomous driving vehicle 2 in the parking place 50. Another autonomous driving vehicle 2 means the autonomous driving vehicle 2 other than the target vehicle 2 that is focused on to specify the node section and the target node in the autonomous driving vehicles 2. Another autonomous driving vehicle 2 may include a fail vehicle.

The node status includes information on whether or not passing of the node is allowed (node passable status and node impassable status). For example, when the next-passing node is in a node impassable status, the target vehicle 2 cannot pass the next-passing node. Therefore, the target vehicle 2 is instructed by the vehicle instruction unit 17 to be described later to temporarily stop or decelerate before the next-passing node. For example, when the next-passing node is in a node passable status, the target vehicle 2 can pass the next-passing node. Therefore, for example, the target vehicle 2 that has been temporarily stopped in response to an instruction from the vehicle instruction unit 17 to be described later is started by receiving an advancing instruction, and is instructed to pass and travel on the next-passing node.

Whether or not passing of the node is allowed may be determined based on the position information of the other autonomous driving vehicle 2. Whether or not passing of the node is allowed may be determined based on the target route of the other autonomous driving vehicle 2. Whether or not passing of the node is allowed may be determined based further on the position information of pedestrians in the parking place 50. Whether or not passing of the node is allowed may be determined based on an execution schedule of automated valet parking by the parking place management server 1.

The node status setting unit 16 may set a node status based on the traveling state of the target vehicle 2. As the traveling state of the target vehicle 2, for example, the vehicle speed of the target vehicle 2 may be used. Whether or not passing of the node is allowed may be determined according to a difference between the vehicle speed of the target vehicle 2 and a predetermined vehicle speed limit. The predetermined vehicle speed limit may be a preset target vehicle speed or an upper limit vehicle speed in the parking place 50.

The vehicle instruction unit 17 gives an instruction to the autonomous driving vehicle 2 that performs automated valet parking. When the autonomous driving vehicle 2 starts the automated valet parking, the vehicle instruction unit 17 gives an instruction on a target route for the autonomous driving vehicle 2 to reach a target parking space. The method of determining the target parking space is not particularly limited. Parking spaces may be assigned from the exit side in the order of entry into the parking place, or parking spaces may be assigned from the exit side in the order in which the pick-up reservation time is closer. The user may be allowed to designate the target parking space. The vehicle instruction unit 17 does not need to give instructions on all the target routes from the current position of the autonomous driving vehicle 2 to reach the target parking space at one time, and may be configured to give instructions on the target route partially. The vehicle instruction unit 17 gives an instruction on a target route for the autonomous driving vehicle 2 to reach the pick-up space 63 when the autonomous driving vehicle 2 is picked up.

The vehicle instruction unit 17 calculates a target route for the target vehicle 2 to reach the target parking space from the position of the target vehicle 2 based on the vehicle position of the target vehicle 2, which is acquired by the vehicle information acquisition unit 11. The vehicle instruction unit 17 calculates, for example, a route that can reach the target parking space with the shortest traveling distance along the traveling path in the parking place as the target route. The vehicle instruction unit 17 may calculate a new target route for the target vehicle 2 not to intersect with a target route of another autonomous driving vehicle 2. The vehicle instruction unit 17 may determine the target parking space in consideration of the target route. The vehicle instruction unit 17 may give an instruction on an upper limit vehicle speed in the parking place together with the target route. The vehicle instruction unit 17 may give an instruction on an upper limit acceleration. The upper limit vehicle speed and the upper limit acceleration are predetermined.

The vehicle instruction unit 17 may give an instruction on deceleration or acceleration of the target vehicle 2. By controlling stop and advance of the target vehicle 2 according to a status of another autonomous driving vehicle 2, the vehicle instruction unit 17 causes the target vehicle 2 to travel to the target parking space while avoiding approaching the other autonomous driving vehicle 2. The vehicle instruction unit 17 here gives an instruction to the target vehicle 2 by transmitting the node information associated with the target node to the target vehicle 2 based on the acquisition result of the node information acquisition unit 13, the specification result of the node section specification unit 14, and the specification result of the target node specification unit 15. For example, when the node status at the next-passing node is a node impassable status, the vehicle instruction unit 17 here suspends transmission of the node information of the target node ahead of the next-passing node among unpassed nodes to the target vehicle 2. When it is determined whether or not the node status at the next-passing node is a node impassable status and determination is made that the node status is a node impassable status, the vehicle instruction unit 17 suspends the transmission of the node information of the target node ahead of the next-passing node among the unpassed nodes to the target vehicle 2.

When the node status at the next-passing node is re-set by the node status setting unit 16 from the node impassable status to a node passable status, the vehicle instruction unit 17 transmits the node information of the target node ahead of the next-passing node among the unpassed nodes to the target vehicle 2. When it is determined whether or not the node status at the next-passing node is re-set to the node passable status and determination is made that the node status is re-set to the node passable status, the vehicle instruction unit 17 transmits the node information associated with the target node to the target vehicle 2.

For example, when the node status at the next-passing node is a node impassable status, the vehicle instruction unit 17 may give a deceleration instruction or a temporary stop instruction to the target vehicle 2. For example, when the target vehicle 2 is decelerated or temporarily stopped according to the node impassable status at the next-passing node, and determination is made that the node status at the next-passing node has not been re-set to the node passable status, the vehicle instruction unit 17 may give a temporary stop instruction to the target vehicle 2. For example, when the target vehicle 2 is decelerated or temporarily stopped according to the node impassable status, and determination is made that the node status at the next-passing node has been re-set to the node passable status, the vehicle instruction unit 17 may give an advancing instruction to the target vehicle 2. The deceleration instruction is an instruction to decelerate the traveling target vehicle 2. The temporary stop instruction is an instruction to temporarily stop the target vehicle 2. The advancing instruction is an instruction to advance (start) the temporarily stopped target vehicle 2.

Subsequently, the autonomous driving vehicle 2 and the user frontend 3 that communicate with the parking place management server 1 will be described. The automated valet parking system 100 according to the present embodiment does not need to include the autonomous driving vehicle 2 and the user frontend 3.

As illustrated in FIG. 1, the autonomous driving vehicle 2 includes an autonomous driving ECU 20 as an example. The autonomous driving ECU 20 is an electronic control unit including a CPU, a ROM, a RAM, and the like. In the autonomous driving ECU 20, for example, a program recorded in the ROM is loaded into the RAM, and various functions are implemented by the CPU executing the program loaded into the RAM. The autonomous driving ECU 20 may include a plurality of electronic units.

The autonomous driving ECU 20 is connected to a communication unit 21, an external sensor 22, an internal sensor 23, and an actuator 24.

The communication unit 21 is a communication device that controls wireless communication with the outside of the autonomous driving vehicle 2. The communication unit 21 transmits and receives various types of information through communication with the parking place management server 1. The communication unit 21 transmits, for example, vehicle information to the parking place management server 1 and acquires information (for example, information on a landmark along a target route) needed for automated valet parking from the parking place management server 1. In addition, the communication unit 21 performs communication with the user frontend 3 associated with the autonomous driving vehicle 2.

The external sensor 22 is an in-vehicle sensor that detects an external environment of the autonomous driving vehicle 2. The external sensor 22 includes at least a camera. The camera is an imaging device that captures an image of an external environment of the autonomous driving vehicle 2. The camera is provided, for example, behind a windshield of the autonomous driving vehicle 2 and captures an image in front of the vehicle. The camera transmits imaging information on the external environment of the autonomous driving vehicle 2 to the autonomous driving ECU 20. The camera may be a monocular camera or a stereo camera. A plurality of cameras may be provided, and in addition to the front of the autonomous driving vehicle 2, the right and left sides and the rear may be imaged.

The external sensor 22 may include a radar sensor. The radar sensor is a detection device that detects an object around the autonomous driving vehicle 2 using radio waves (for example, millimeter waves) or light. The radar sensor includes, for example, a millimeter wave radar or a light detection and ranging (LIDAR). The radar sensor transmits a radio wave or light to the vicinity of the autonomous driving vehicle 2 and detects the object by receiving the radio wave or light reflected by the object. The radar sensor transmits the detected object information to the autonomous driving ECU 20. In addition, the external sensor 22 may include a sonar sensor that detects a sound outside the autonomous driving vehicle 2.

The internal sensor 23 is an in-vehicle sensor that detects a traveling state of the autonomous driving vehicle 2. The internal sensor 23 includes a vehicle speed sensor, an acceleration sensor, and a yaw rate sensor. The vehicle speed sensor is a detector that detects the speed of the autonomous driving vehicle 2. As the vehicle speed sensor, wheel speed sensors that are provided for wheels of the autonomous driving vehicle 2 or for drive shafts that rotate integrally with the wheels and that detect rotation speeds of the respective wheels can be used. The vehicle speed sensor transmits the detected vehicle speed information (wheel speed information) to the autonomous driving ECU 20.

The acceleration sensor is a detector that detects the acceleration of the autonomous driving vehicle 2. The acceleration sensor includes, for example, a longitudinal acceleration sensor that detects the longitudinal acceleration of the autonomous driving vehicle 2. The acceleration sensor may include a lateral acceleration sensor that detects the lateral acceleration of the autonomous driving vehicle 2. The acceleration sensor transmits, for example, acceleration information of the autonomous driving vehicle 2 to the autonomous driving ECU 20. The yaw rate sensor is a detector that detects a yaw rate (rotational angular velocity) of the center of gravity of the autonomous driving vehicle 2 around a vertical axis. As the yaw rate sensor, for example, a gyro sensor can be used. The yaw rate sensor transmits the detected yaw rate information of the autonomous driving vehicle 2 to the autonomous driving ECU 20.

The actuator 24 is a device used for controlling the autonomous driving vehicle 2. The actuator 24 includes at least a drive actuator, a brake actuator, and a steering actuator. The drive actuator controls the supply amount of air to the engine (throttle opening degree) according to a control signal from the autonomous driving ECU 20 to control a driving force of the autonomous driving vehicle 2. When the autonomous driving vehicle 2 is a hybrid vehicle, the control signal from the autonomous driving ECU 20 is input to a motor as a power source in addition to the supply amount of air to the engine, so that the driving force of the autonomous driving vehicle 2 is controlled. When the autonomous driving vehicle 2 is an electric vehicle, the control signal from the autonomous driving ECU 20 is input to a motor as a power source, so that the driving force of the autonomous driving vehicle 2 is controlled. The motor as the power source in these cases forms the actuator 24.

The brake actuator controls a brake system according to the control signal from the autonomous driving ECU 20 to control a braking force applied to the wheels of the autonomous driving vehicle 2. As the brake system, for example, a hydraulic brake system can be used. The steering actuator controls driving of an assist motor for controlling a steering torque in an electric power steering system according to the control signal from the autonomous driving ECU 20. Thereby, the steering actuator controls the steering torque of the autonomous driving vehicle 2.

Next, an example of a functional configuration of the autonomous driving ECU 20 will be described. The autonomous driving ECU 20 includes an external environment recognition unit 31, a traveling state recognition unit 32, a vehicle position recognition unit 33, a vehicle information providing unit 34, and a vehicle control unit 35.

The external environment recognition unit 31 recognizes the external environment of the autonomous driving vehicle 2 based on the detection result of the external sensor 22 (the image captured by the camera or the object information detected by the radar sensor). The external environment includes a relative position of a surrounding object with respect to the autonomous driving vehicle 2. The external environment may include a relative speed and a moving direction of the surrounding object with respect to the autonomous driving vehicle 2. The external environment recognition unit 31 recognizes other vehicles and objects such as pillars of the parking place by pattern matching or the like. The external environment recognition unit 31 may recognize a parking place gate, a parking place wall, a pole, a safety cone, and the like. In addition, the external environment recognition unit 31 may recognize driving boundaries in the parking place by white line recognition.

The traveling state recognition unit 32 recognizes the traveling state of the autonomous driving vehicle 2 based on the detection result of the internal sensor 23. The traveling state includes the vehicle speed of the autonomous driving vehicle 2, the acceleration of the autonomous driving vehicle 2, and the yaw rate of the autonomous driving vehicle 2. Specifically, the traveling state recognition unit 32 recognizes the vehicle speed of the autonomous driving vehicle 2 based on the vehicle speed information of the vehicle speed sensor. The traveling state recognition unit 32 recognizes the acceleration of the autonomous driving vehicle 2 based on the vehicle speed information of the acceleration sensor. The traveling state recognition unit 32 recognizes the direction of the autonomous driving vehicle 2 based on the yaw rate information of the yaw rate sensor.

The vehicle position recognition unit 33 recognizes the position of the autonomous driving vehicle 2 in the parking place based on the parking place map information acquired from the parking place management server 1 through the communication unit 21 and the external environment recognized by the external environment recognition unit 31.

The vehicle position recognition unit 33 recognizes the position of the autonomous driving vehicle 2 in the parking place based on the position information of the landmark in the parking place included in the parking place map information and the relative position of the landmark with respect to the autonomous driving vehicle 2 recognized by the external environment recognition unit 31.

In addition, the vehicle position recognition unit 33 may recognize the position of the autonomous driving vehicle 2 by dead reckoning based on the detection result of the internal sensor 23. Further, the vehicle position recognition unit 33 may recognize the position of the autonomous driving vehicle 2 by communicating with a beacon provided in the parking place.

The vehicle information providing unit 34 provides vehicle information to the parking place management server 1 through the communication unit 21. The vehicle information providing unit 34 provides the parking place management server 1 with vehicle information including, for example, information on the position of the autonomous driving vehicle 2 in the parking place recognized by the vehicle position recognition unit 33 at regular intervals.

The vehicle control unit 35 executes autonomous driving of the autonomous driving vehicle 2. In the autonomous driving, the autonomous driving vehicle 2 automatically travels along the target route instructed by the parking place management server 1. The vehicle control unit 35 generates a trajectory of the autonomous driving vehicle 2 based on, for example, the target route, the position of the autonomous driving vehicle 2, the external environment of the autonomous driving vehicle 2, and the traveling state of the autonomous driving vehicle 2. The trajectory corresponds to a travel plan for autonomous driving. The trajectory includes a path along which the vehicle travels by autonomous driving and a vehicle speed plan in autonomous driving.

The path is a trajectory on which the vehicle that is autonomously driving will travel on the target route. The path can be, for example, data of a change in the steering angle of the autonomous driving vehicle 2 based on the position on the target route (steering angle plan). The position on the target route is, for example, a set vertical position set at predetermined intervals (for example, 1 m) in the advancing direction on the target route. The steering angle plan is data in which a target steering angle is associated with each set vertical position.

The vehicle control unit 35 generates a trajectory to pass through the center of the traveling path of the parking place along the target route, for example. When the vehicle control unit 35 receives the instruction on the upper limit vehicle speed from the parking place management server 1, the vehicle control unit 35 generates a trajectory such that the vehicle speed plan does not exceed the upper limit vehicle speed. The vehicle control unit 35 may generate the trajectory using the parking place map information acquired by communicating with the parking place management server 1.

When the temporary stop instruction is received from the parking place management server 1, the vehicle control unit 35 stops the autonomous driving vehicle 2. When an advancing instruction is received from the parking place management server 1, the vehicle control unit 35 advances the stopped autonomous driving vehicle 2. The example of the configuration of the autonomous driving vehicle 2 has been described above, but the autonomous driving vehicle 2 is not limited to the above contents as long as the autonomous driving vehicle 2 is capable of implementing automated valet parking.

The user frontend 3 is a portable information terminal of the user associated with the autonomous driving vehicle 2. The user frontend 3 is registered in the autonomous driving vehicle 2 as the terminal of the owner of the autonomous driving vehicle 2, for example. The user frontend 3 may be a terminal of a user who is registered as an authority holder in the autonomous driving vehicle 2 by a temporary owner by rental or transfer of the instruction authority from the owner. The user frontend 3 is configured by a computer including a processor such as a CPU, a memory such as a ROM or a RAM, and a user interface including a display and a touch panel, for example.

The user frontend 3 has a function of making a vehicle entrance request and a pick-up request to the parking place management server 1. By operating the user frontend 3, the user can make a vehicle entrance request and a pick-up request for the automated valet parking. For example, the user stops the autonomous driving vehicle 2 in the drop-off space 62 of the drop-off area 52 of the parking place 50 and gets out of the vehicle, and then gives the parking place management server 1 the instruction authority for the autonomous driving vehicle 2 by operating the user frontend 3 to complete the vehicle entrance request.

The user allows the autonomous driving vehicle 2 parked in the parking space 61 to travel to the pick-up space 63 of the pick-up area 53 through the parking place management server 1 by making a pick-up request. The autonomous driving vehicle 2 waits for the user in the pick-up space 63. For example, when the autonomous driving vehicle 2 arrives at the pick-up space 63 and stops, the parking place management server 1 terminates the instruction authority for the autonomous driving vehicle 2. The instruction authority may be terminated when the user gives an instruction to open the door or start the vehicle to the autonomous driving vehicle 2. The autonomous driving vehicle 2 may terminate the instruction authority. In addition, the operation of the autonomous driving vehicle 2 associated with the vehicle entrance request and the pick-up request is not limited to the above-described aspect. The same applies to the parking place management server 1.

[Processing of Automated Valet Parking System]

Figure 5:
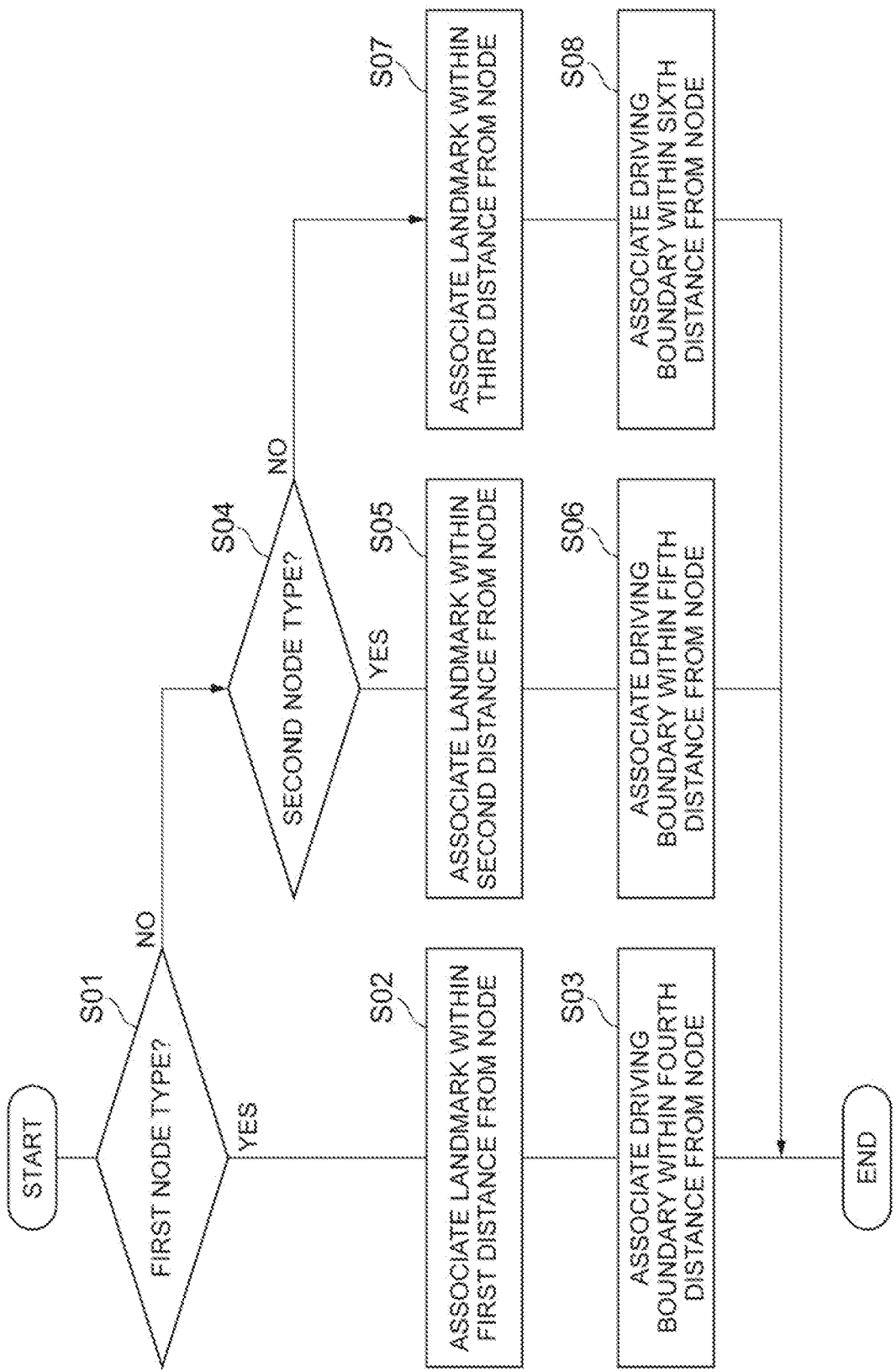
FIG. 5 is a flowchart illustrating an example of node information association processing.

Next, the processing of the automated valet parking system 100 will be described with reference to the drawings. FIG. 5 is a flowchart illustrating an example of node information association processing. The node information association processing is executed before the automated valet parking is started, such as when the autonomous driving vehicle 2 capable of communicating with the parking place management server 1 enters the parking place, for example. The node information association processing may be executed, for example, when the instruction authority for the target vehicle 2 is obtained.

As illustrated in FIG. 5, in S01, the parking place management server 1 of the automated valet parking system 100 causes the node information acquisition unit 13 to determine whether or not a node label is the first node type (whether or not the node is located near the parking space). When determination is made that the node label is the first node type (S01: YES), the parking place management server 1 causes the processing to proceed to S02. In S02, the parking place management server 1 causes the node information acquisition unit 13 to associate landmarks within the first distance from the node. In S03, the parking place management server 1 causes the node information acquisition unit 13 to associate driving boundaries within the fourth distance from the node.

When determination is made that the node label is not the first node type (S01: NO), the parking place management server 1 causes the processing to proceed to S04. In S04, the node information acquisition unit 13 determines whether or not the node label is the second node type (whether or not the node is located in the curve section). When determination is made that the node label is the second node type (S04: YES), the parking place management server 1 causes the processing to proceed to S05. In S05, the parking place management server 1 causes the node information acquisition unit 13 to associate landmarks within the second distance from the node. In S06, the parking place management server 1 causes the node information acquisition unit 13 to associate the driving boundaries within the fifth distance from the node.

When determination is made that the node label is not the second node type (S04: NO), the parking place management server 1 causes the processing to proceed to S07. In S07, the parking place management server 1 causes the node information acquisition unit 13 to associate landmarks within the third distance from the node. In S08, the parking place management server 1 causes the node information acquisition unit 13 to associate the driving boundaries within the sixth distance from the node.

Figure 6:
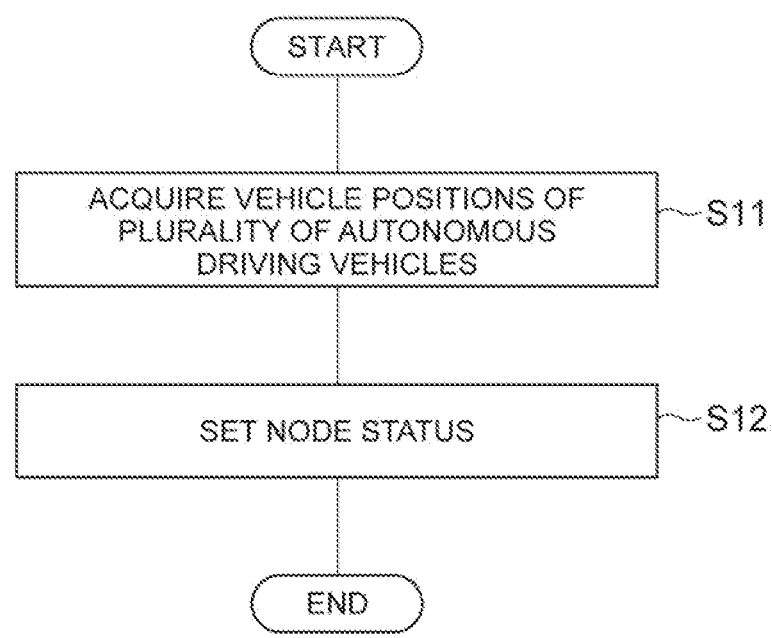
FIG. 6 is a flowchart illustrating an example of node status setting processing.

FIG. 6 is a flowchart illustrating an example of node status setting processing. The node status setting processing is performed during execution of automated valet parking, for example.

As illustrated in FIG. 6, in S11, the parking place management server 1 of the automated valet parking system 100 causes the node status setting unit 16 to acquire the vehicle positions of the plurality of autonomous driving vehicles 2 in the parking place. In S12, the parking place management server 1 causes the node status setting unit 16 to set the node status. Subsequently, the parking place management server 1 ends the processing in the current time. The parking place management server 1 repeats the processing of FIG. 6 again, for example, after a lapse of a certain time.

Figure 7:
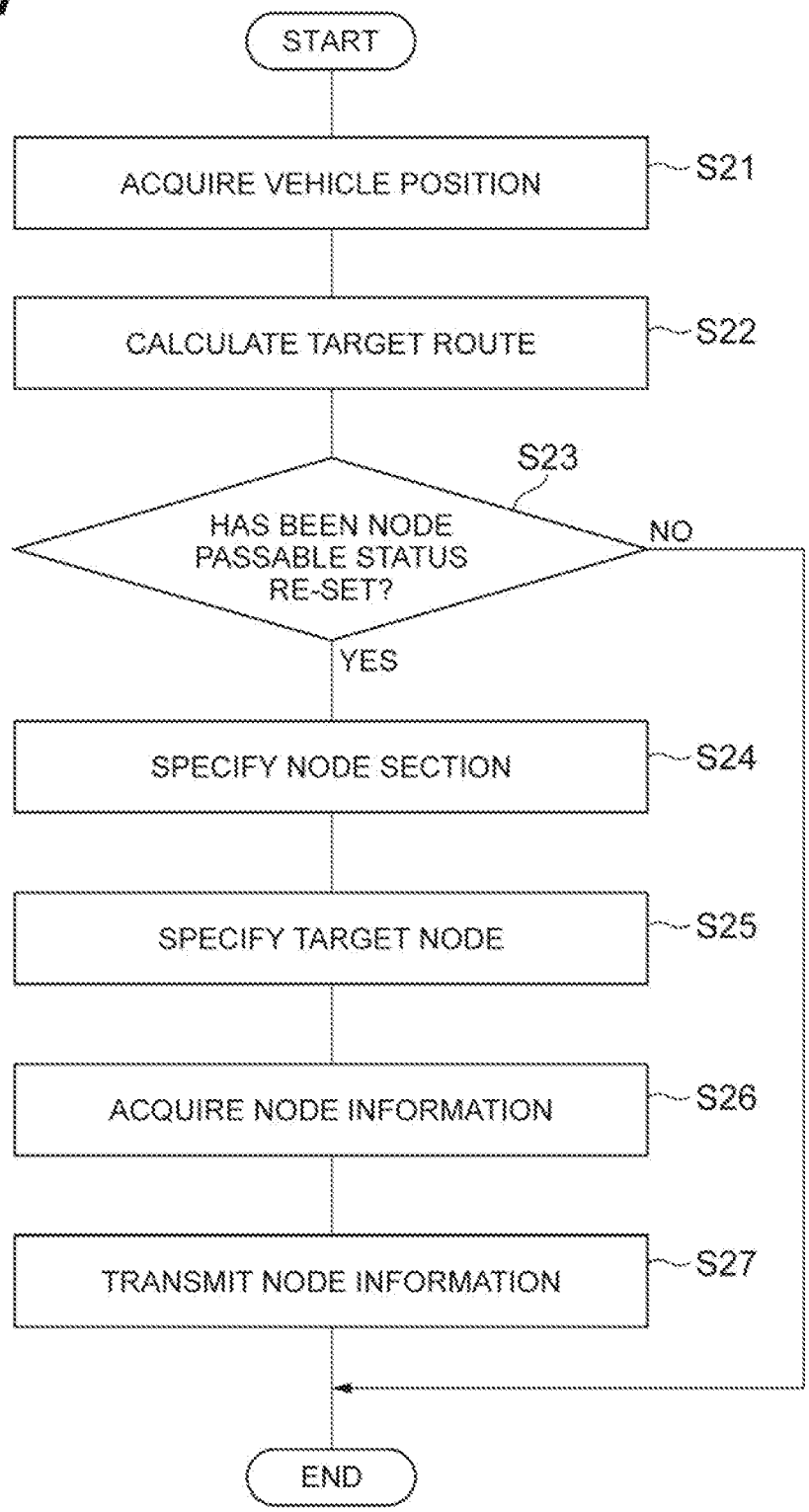
FIG. 7 is a flowchart illustrating an example of vehicle instruction processing.

FIG. 7 is a flowchart illustrating an example of vehicle instruction processing. The parking place management server 1 performs the vehicle instruction processing after the processing of FIGS. 5 and 6 is performed at least once during execution of automated valet parking, for example.

As illustrated in FIG. 7, in S21, the parking place management server 1 causes the vehicle information acquisition unit 11 to acquire the vehicle position of the target vehicle 2. In S22, the parking place management server 1 causes the vehicle instruction unit 17 to calculate the target route. In S23, the parking place management server 1 causes the vehicle instruction unit 17 to determine whether or not the node passable status has been re-set.

When the vehicle instruction unit 17 determines that the node passable status has been re-set (S23: YES), the parking place management server 1 causes the processing to proceed to S24. In S24, the parking place management server 1 causes the node section specification unit 14 to specify the node section in which the target vehicle 2 is present.

Figure 8:
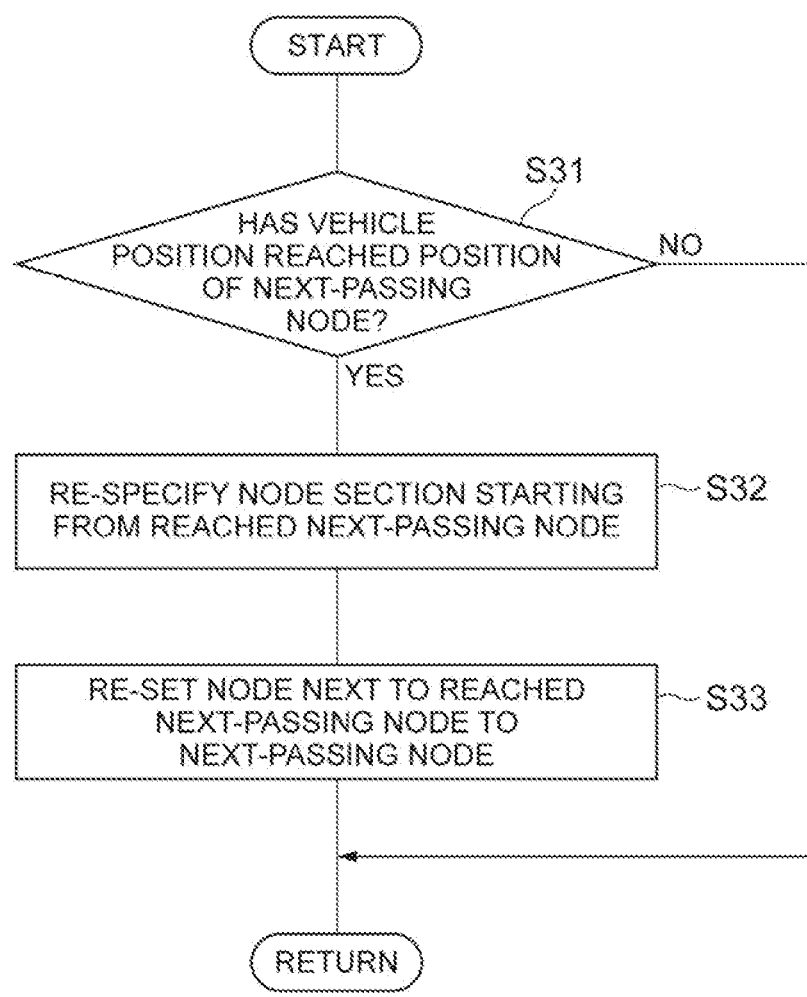
FIG. 8 is a flowchart illustrating an example of node section specification processing.

More specifically, the processing of S24 is performed as exemplified in FIG. 8. Immediately after the start of the automated valet parking, regardless of the processing of FIG. 8, a section from a node immediately behind the vehicle position when the automated valet parking is started to a node immediately before the vehicle position may be specified as the node section and the node immediately before the vehicle position may be set as a next-passing node.

FIG. 8 is a flowchart illustrating an example of node section specification processing. As illustrated in FIG. 8, in S31, the parking place management server 1 causes the node section specification unit 14 to determine whether or not the vehicle position of the target vehicle 2 has reached the position of the next-passing node.

When the node section specification unit 14 determines that the vehicle position of the target vehicle 2 has reached the position of the next-passing node (S31: YES), the parking place management server 1 causes the processing to proceed to S32. When the node section specification unit 14 determines that the vehicle position of the target vehicle 2 has not reached the position of the next-passing node (S31: NO), the parking place management server 1 ends the processing of FIG. 8 in the current time. Subsequently, the parking place management server 1 executes the processing of FIG. 8 when performing the processing of S24 again, for example.

In S32, the parking place management server 1 causes the node section specification unit 14 to re-specify the node section starting from the next-passing node reached by the target vehicle 2. In S33, the parking place management server 1 causes the node section specification unit 14 to re-set a node next to the next-passing node reached by the target vehicle 2 to a new next-passing node. Subsequently, the processing of FIG. 8 in the current time is ended. Subsequently, the parking place management server 1 executes the processing of FIG. 8 when performing the processing of S24 again, for example.

Referring back to FIG. 7, in S25, the parking place management server 1 causes the target node specification unit 15 to specify a target node to which information is to be transmitted to the target vehicle 2.

Figure 9:
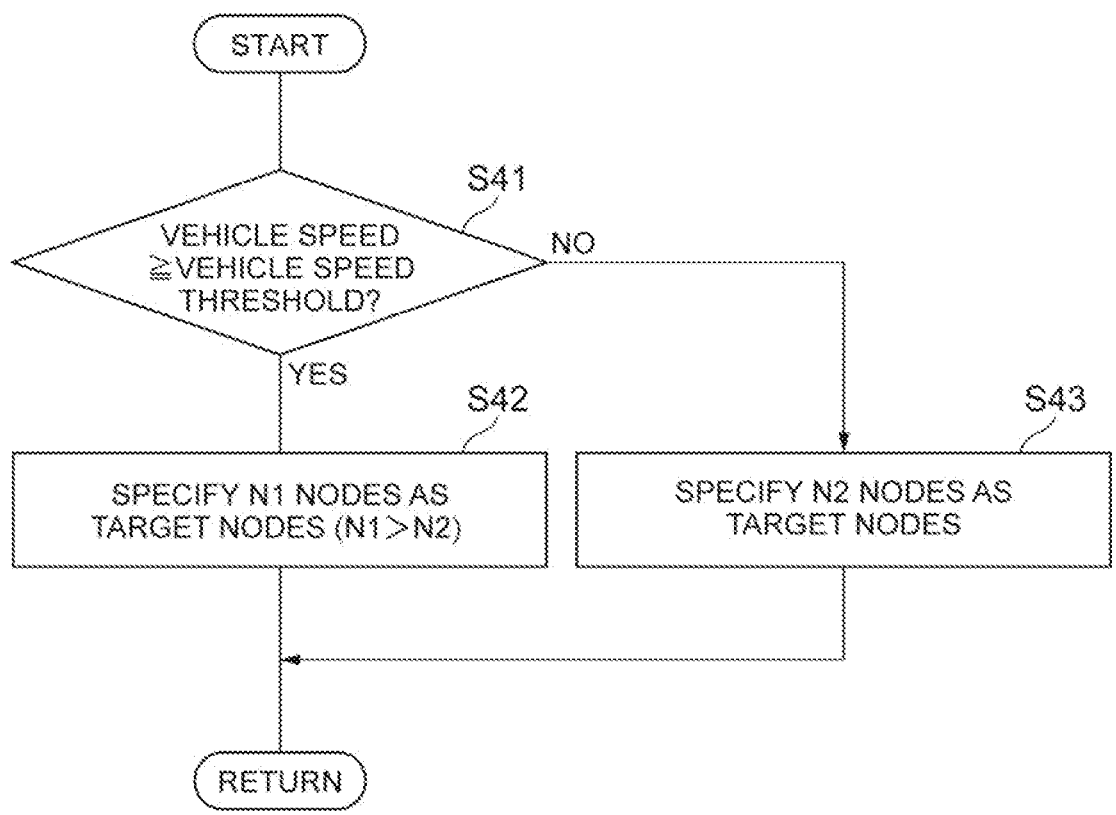
FIG. 9 is a flowchart illustrating an example of target node specification processing.

More specifically, the processing of S25 is performed as exemplified in FIG. 9. FIG. 9 is a flowchart illustrating an example of target node specification processing. As illustrated in FIG. 9, in S41, the parking place management server 1 causes the target node specification unit 15 to determine whether or not the vehicle speed of the target vehicle 2 is equal to or higher than a predetermined vehicle speed threshold.

When the target node specification unit 15 determines that the vehicle speed of the target vehicle 2 is equal to or higher than a vehicle speed threshold (S41: YES), the parking place management server 1 causes the processing to proceed to S42. When the target node specification unit 15 determines that the vehicle speed of the target vehicle 2 is less than a vehicle speed threshold (S41: NO), the parking place management server 1 causes the processing to proceed to S43.

In S42, the parking place management server 1 causes the target node specification unit 15 to specify N1 nodes including the next-passing node and more than N2 nodes as target nodes. Subsequently, the processing of FIG. 9 in the current time is ended. On the other hand, in S43, the parking place management server 1 causes the target node specification unit 15 to specify N2 nodes including the next-passing node as target nodes. Subsequently, the parking place management server 1 ends the processing of FIG. 9 in the current time. The parking place management server 1 executes the processing of FIG. 9 when performing the processing of S25 again, for example.

Referring back to FIG. 7, in S26, the parking place management server 1 causes the node information acquisition unit 13 to acquire the node information associated with the target node. In S27, the parking place management server 1 causes the vehicle instruction unit 17 to transmit the node information to the target vehicle 2. For example, when the target vehicle 2 is temporarily stopped according to the node impassable status, the vehicle instruction unit 17 may give an advancing instruction to the target vehicle 2. Subsequently, the parking place management server 1 ends the processing in the current time. The parking place management server 1 repeats the processing of FIG. 7 again, for example, after a lapse of a certain time.

On the other hand, when the vehicle instruction unit 17 determines that the node passable status has not been re-set (S23: NO), the parking place management server 1 ends the processing in the current time. That is, when the node status at the next-passing node is a node impassable status, the vehicle instruction unit 17 suspends transmission of the node information of the target node ahead of the next-passing node among unpassed nodes to the target vehicle 2. For example, when the target vehicle 2 is temporarily stopped according to the node impassable status, the vehicle instruction unit 17 may cause the target vehicle 2 to maintain the temporary stop without giving an advancing instruction to the target vehicle 2. Subsequently, the parking place management server 1 repeats the processing of FIG. 7 again, for example, after a lapse of a certain time.

Figure 10:
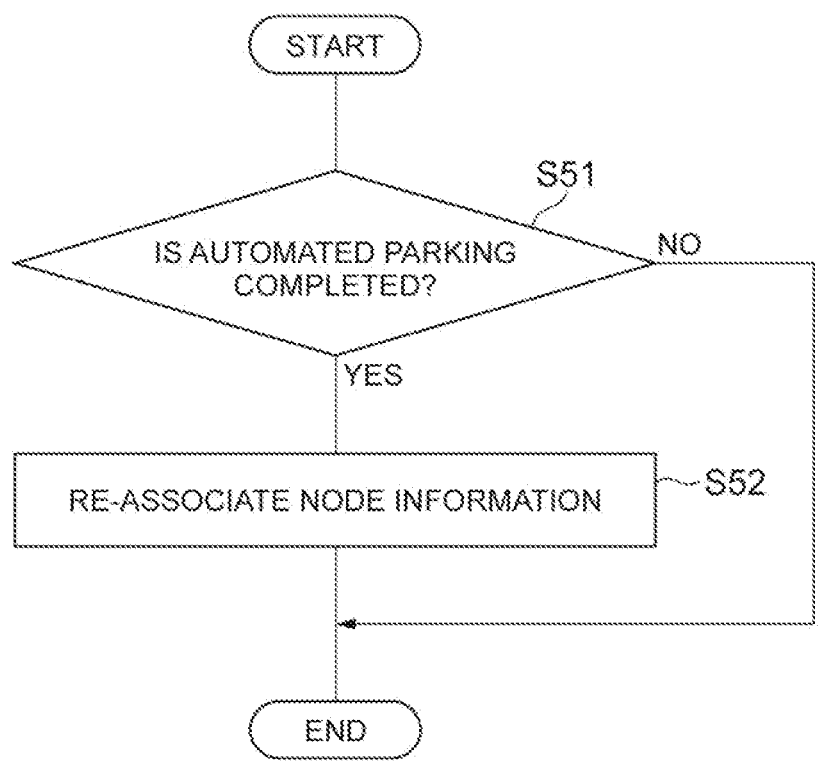
FIG. 10 is a flowchart illustrating an example of node information re-association processing.

The processing of FIG. 10 may be performed in parallel with the processing of FIGS. 6 to 9. FIG. 10 is a flowchart illustrating an example of node information re-association processing. As illustrated in FIG. 10, in S51, the parking place management server 1 causes the node information acquisition unit 13 to determine whether or not the automated parking of the autonomous driving vehicle 2 is completed.

When the node information acquisition unit 13 determines that the automated parking of the autonomous driving vehicle 2 is completed (S51: YES), the parking place management server 1 causes the processing to proceed to S52. In S52, the parking place management server 1 causes the node information acquisition unit 13 to re-associate the node information. As the processing of S52, specifically, the parking place management server 1 executes the processing of FIG. 5 again.

On the other hand, when the node information acquisition unit 13 determines that the automated parking of the autonomous driving vehicle 2 is not completed (S51: NO), the parking place management server 1 ends the processing of FIG. 10 in the current time. Subsequently, the parking place management server 1 executes the processing of FIG. 10, for example, after a lapse of a certain time.

With the automated valet parking system 100 according to the present embodiment described above, a predetermined number of nodes including the next-passing node are specified as the target nodes. The predetermined number is smaller than the total number of unpassed nodes. The target vehicle 2 is instructed by transmitting the node information associated with the target node to the target vehicle 2. Therefore, as an aspect of information transmission, for example, compared to the case where node information regarding the entire target route in the parking place 50 from the drop-off space 62 to the target parking space is collectively transmitted to the target vehicle 2, it is possible to reduce an amount of transmission data and a memory capacity required in the target vehicle 2 (autonomous driving vehicle 2). In addition, with the above-described automated valet parking system 100, when the node status at the next-passing node is re-set to the node passable status, the node information of the target node ahead of the next-passing node among the unpassed nodes is transmitted to the target vehicle 2, as the node information required for the target vehicle 2. Thereby, it is possible to further reduce the amount of transmission data and the memory capacity required in the target vehicle 2 (autonomous driving vehicle 2).

In addition, with the automated valet parking system 100, when the vehicle speed of the target vehicle 2 is equal to or higher than a predetermined vehicle speed threshold, the target node specification unit 15 specifies the target node by setting a predetermined number as a large number (N1) compared to when the vehicle speed is less than the vehicle speed threshold (N2). Thereby, it is possible to specify an appropriate number of target nodes according to the vehicle speed of the target vehicle 2.

In addition, with the automated valet parking system 100, the node status setting unit 16 sets a node status based on the traveling state of the target vehicle 2. Thereby, it is possible to set a node status according to the traveling state of the target vehicle 2.

Further, with the automated valet parking system 100, the parking place map information further includes node label information regarding a type of the node, the node label information includes a type of the node indicating that the node is located near a parking space, the node information acquisition unit 13 is configured to associate the driving boundary and the landmark within a predetermined distance from a position of the node with the node based on the parking place map information and the node label information, and the predetermined distance when the node is located near the parking space is larger than the predetermined distance when the node is not located near the parking space. Thereby, it is possible to change the presence range of the driving boundary and the landmark associated with the node depending on whether or not the node is located near the parking space as the type of the node.

Although the embodiment of the present disclosure has been described above, the present disclosure is not limited to the above-described embodiment. The present disclosure can be implemented in various forms including various modifications and improvements based on the knowledge of those skilled in the art, including the above-described embodiment.

The parking place management server 1 does not need to be able to directly communicate with the autonomous driving vehicle 2, and may be configured to communicate through another server or the like. The parking place management server 1 may communicate with the autonomous driving vehicle 2 through a management server on the manufacturer side of the autonomous driving vehicle 2 or an operation server of Mobility-as-a-Service (MaaS), for example. In this case, communication interruption determination may be made by the server through which the communication is performed.

The target node specification unit 15 does not necessarily have to change a predetermined number of target nodes according to the vehicle speed of the target vehicle 2.

The node status setting unit 16 does not necessarily have to set a node status based on the traveling state of the target vehicle 2.

As the type of the node, the first node type in which the node is located near a parking space, the second node type in which the node is located in a curve section, and the third node type in which no node is located near a parking space or in a curve section are exemplified; however, among these three types, one or two types may be omitted, or other types may be further included. Alternatively, the parking place map information does not necessarily have to include node label information regarding the type of the node.

Although the node information acquisition unit 13 associates the driving boundary and the marker within a predetermined distance from the position of the node with the node based on the parking place map information and the node label information, the node label information does not necessarily have to be used in the association.

In the above-described embodiment, the node section is configured such that, for example, a node behind in the advancing direction of the target vehicle 2 is included and a node ahead in the traveling direction of the target vehicle 2 is not included. However, in contrast, the node section may be configured such that a node behind in the advancing direction of the target vehicle 2 is not included and a node ahead in the traveling direction of the target vehicle 2 is included.

What is claimed is:

1. An automated valet parking system comprising:
   a storage device storing parking place map information that includes node position information of a plurality of nodes corresponding to passages in a parking place, and node information including driving boundaries and markers associated with the nodes; and
   a processor configured to:
   acquire a vehicle position of an autonomous driving vehicle in the parking place;
   identify unpassed nodes that form a target route to lead the autonomous driving vehicle from the vehicle position to a target parking space;
   select a subgroup of the unpassed nodes as target nodes, wherein a number of the target nodes is less than a total number of the unpassed nodes, and wherein one of the target nodes that is closest to the vehicle position is set as a next-passing node;
   transmit at least the node information of the next-passing node among the node information associated with the target nodes;
   set a node status of the next-passing node to an impassible status, based on the target route of the autonomous driving vehicle and a vehicle position of another vehicle in the parking place;
   in response to the impassible status of the next passing node, suspend a transmission of the node information associated with the target nodes other than the next-passing node, and instruct the autonomous driving vehicle to decelerate; and
   in response to a status change of the next-passing node from the impassable status to a passable status, instruct the vehicle to advance along a portion of the target route leading to the target parking space by resuming the transmission of the node information of the target nodes.

2. The automated valet parking system according to claim 1, wherein the processor is further configured to:
   detect that a vehicle speed of the autonomous driving vehicle exceeds a predetermined vehicle speed threshold; and
   increase the number of the target nodes selected in response to the vehicle speed detected, so as to vary a length of the portion of the route corresponding to the target nodes based on the vehicle speed.

3. The automated valet parking system according to claim 1, wherein the node status of the next-passing node is set based on a vehicle speed of the autonomous driving vehicle.

4. The automated valet parking system according to claim 2, wherein the node status of the next-passing node is set based on the vehicle speed of the autonomous driving vehicle.

5. The automated valet parking system according to claim 1,
   wherein the nodes of the parking place map information include first nodes that are located within a predetermined distance of a parking space, second nodes that are located along a curved segment of the passages, and third nodes that are located outside of the predetermined distance from any parking space and outside of any curved segment of the passages,
   wherein the first nodes are associated with boundaries and markers located within a first radius around the respective first nodes,
   wherein the second nodes are associated with boundaries and markers located within a second radius around the respective second nodes, that is shorter than the first radius, and
   wherein the third nodes are associated with boundaries and markers located within a third radius around the respective third nodes, that is shorter than the second radius.

6. The automated valet parking system according to claim 2,
   wherein the nodes of the parking place map information include first nodes that are located within a predetermined distance of a parking space, second nodes that are located along a curved segment of the passages, and third nodes that are located outside of the predetermined distance from any parking space and outside of any curved segment of the passages,
   wherein the first nodes are associated with boundaries and markers located within a first radius around the respective first nodes,
   wherein the second nodes are associated with boundaries and markers located within a second radius around the respective second nodes, that is shorter than the first radius, and
   wherein the third nodes are associated with boundaries and markers located within a third radius around the respective third nodes, that is shorter than the second radius.

7. The automated valet parking system according to claim 3,
   wherein the nodes of the parking place map information include first nodes that are located within a predetermined distance of a parking space, second nodes that are located along a curved segment of the passages, and third nodes that are located outside of the predetermined distance from any parking space and outside of any curved segment of the passages,
   wherein the first nodes are associated with boundaries and markers located within a first radius around the respective first nodes, wherein the second nodes are associated with boundaries and markers located within a second radius around the respective second nodes, that is shorter than the first radius, and wherein the third nodes are associated with boundaries and markers located within a third radius around the respective third nodes, that is shorter than the second radius.

8. The automated valet parking system according to claim 4, wherein the nodes of the parking place map information include first nodes that are located within a predetermined distance of a parking space, second nodes that are located along a curved segment of the passages, and third nodes that are located outside of the predetermined distance from any parking space and outside of any curved segment of the passages, wherein the first nodes are associated with boundaries and markers located within a first radius around the respective first nodes, wherein the second nodes are associated with boundaries and markers located within a second radius around the respective second nodes, that is shorter than the first radius, and wherein the third nodes are associated with boundaries and markers located within a third radius around the respective third nodes, that is shorter than the second radius.

9. The automated valet parking system according to claim 1, wherein the parking place map information includes node sections corresponding to sections of the passages between adjacent pairs of the nodes, wherein the processor is further configured to identify a node section corresponding to the vehicle position of the autonomous driving vehicle, and wherein the node information is transmitted to the autonomous driving vehicle based on the node section.

10. The automated valet parking system according to claim 1, wherein the autonomous driving vehicle is instructed to decelerate to a halt in response to the impassible status of the next passing node.

11. The automated valet parking system according to claim 1, wherein the autonomous driving vehicle is prevented from driving passed the next-passing node, in response to the impassible status of the next passing node.

12. An automated valet parking system comprising:

a storage device storing parking place map information that includes node position information of a plurality of nodes corresponding to passages in a parking place, and node information including driving boundaries associated with the nodes; and a processor configured to:
acquire a vehicle position of an autonomous driving vehicle in the parking place;
identify unpassed nodes forming a route to lead the autonomous driving vehicle from the vehicle position to a destination in the parking place;
select a subgroup of the unpassed nodes as target nodes so that a number of the target nodes selected is less than a total number of the unpassed nodes, wherein a closest node to the autonomous driving vehicle among the target nodes is set to a next-passing node;
start a transmission of the node information associated with the target nodes;
set a node status of the next-passing node to an impassible status based on a position of a movable object relative to the target nodes;
interrupt the transmission of the node information associated with the target nodes, in response to the impassible status of the next passing node; and
in response to a status change of the next-passing node from the impassable status to a passable status, instruct the vehicle to advance along a portion of the route by resuming the transmission of the node information associated with the target nodes.

13. The automated valet parking system according to claim 12, wherein the transmission of the node information is interrupted by suspending a transmission of the node information associated with the target nodes other than the next-passing node.

14. The automated valet parking system according to claim 12, wherein the number of the target nodes selected among the nodes of the route is determined based on a vehicle speed of the autonomous driving vehicle, so as to vary a length of the portion of the route corresponding to the target nodes based on the vehicle speed.

15. The automated valet parking system according to claim 12, wherein the processor is configured to:
detect an increase in the vehicle speed of the autonomous driving vehicle; and
increase the number of the target nodes selected in response to the increase of the vehicle speed.

16. The automated valet parking system according to claim 12, wherein the movable object is another vehicle, and wherein the node status of the next-passing node is set to an impassible status based on a trajectory of the other vehicle being within a predetermined distance of the target nodes.

17. The automated valet parking system according to claim 12, wherein the processor is further configured to transmit a driving instruction to the autonomous driving vehicle to delay advancing along the portion of the route corresponding to the target nodes, in response to the impassible status of the next-passing node.

18. The automated valet parking system according to claim 12, wherein the node status of the next-passing node is set to the impassible status based on a speed of the movable object.

19. The automated valet parking system according to claim 12, wherein the node information further includes markers associated with the nodes, wherein the markers represent landmarks for position recognition by the autonomous driving vehicle, wherein the node information for each node includes any of the driving boundaries and markers located within a radius around the corresponding node.

20. The automated valet parking system according to claim 19, wherein the radius is set for the corresponding node based on a distance of the node to any parking space in the parking place and on whether the node is located along a non-linear segment of the passages in the parking place.

* * * * *